United States Patent
Meyyappan et al.

(10) Patent No.: US 10,210,498 B1
(45) Date of Patent: Feb. 19, 2019

(54) PAYMENTS VIA A SMART APPLIANCE

(71) Applicant: Wells Fargo Bank, N.A., San Francisco, CA (US)

(72) Inventors: Uma Meyyappan, Freemont, CA (US); Sivesh Thangarajah, San Francisco, CA (US); James Dalton Cahill, Belmont, MA (US); Ramanathan Ramanathan, Bellevue, WA (US); Bipin Sahni, Pleasanton, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 675 days.

(21) Appl. No.: 14/611,487

(22) Filed: Feb. 2, 2015

(51) Int. Cl.
| | |
|---|---|
| G06Q 40/00 | (2012.01) |
| G06Q 20/30 | (2012.01) |
| G06Q 20/40 | (2012.01) |
| G06Q 30/02 | (2012.01) |
| G06Q 20/32 | (2012.01) |
| G06Q 10/00 | (2012.01) |

(52) U.S. Cl.
CPC ........... *G06Q 20/30* (2013.01); *G06Q 10/20* (2013.01); *G06Q 20/3278* (2013.01); *G06Q 20/40* (2013.01); *G06Q 30/0264* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 5,875,430 A | 2/1999 | Koether | |
| 7,580,862 B1 | 8/2009 | Montelo et al. | |
| 8,504,874 B2 | 8/2013 | Goldszmidt et al. | |
| 8,548,624 B2 | 10/2013 | Crisp, III | |
| 2014/0046848 A1 | 2/2014 | Radu et al. | |
| 2015/0339634 A1* | 11/2015 | Xiao | G06Q 10/20 |
| | | | 705/7.13 |

OTHER PUBLICATIONS

Gillett, Frank E., "Pioneer Vendors: Smart, Connected Products for The Internet Of Things", Forrester Research, Inc., Jan. 6, 2014, 15 pages.
Gillett, Frank E., "The Internet of Things Comes Home, Bit by Bit", Forrester Research, Inc., Dec. 23, 2013, 17 pages.
Collins, Jon, "The internet of things: a market landscape", Giga Omni Media, Jun. 18, 2013, 32 pages.
International Telecommunication Union, "ITU Internet Reports 2005 Executive Summary: The Internet of Things", dated Nov. 2005, 28 pages.

* cited by examiner

*Primary Examiner* — Scott S Trotter
(74) *Attorney, Agent, or Firm* — Foley & Lardner LLP (57) ABSTRACT

A method performed by a smart appliance includes linking the smart appliance to a financial account of a user. The method also includes monitoring an operation parameter of the smart appliance, and detecting an operational issue of the smart appliance based on the operation parameter. In addition, the method includes communicating the operational issue to a smart appliance payment system. The method further includes detecting, based on the operation parameter, resolution of the operational issue upon completion of a service event on the smart appliance. Still further, the method includes transferring payment for the service event from the financial account of the user upon detecting the resolution of the operational issue.

34 Claims, 5 Drawing Sheets

PAYMENTS VIA A SMART APPLIANCE

BACKGROUND

As broadband Internet connectivity has become nearly ubiquitous, individuals increasingly rely on Internet-based tools to conduct their daily activities more efficiently and effectively. For example, an individual may manage various financial accounts and facilitate payments for goods and services via Internet-based tools rather than having to visit brick-and-mortar establishments (e.g., banks and merchants). Additionally, low-cost processors and sensors have made devices (e.g., appliances) "smart," such that the devices may collect operational data to improve their efficiency and reliability. Further, such smart devices in the physical world are becoming increasingly interconnected through the Internet by way of various data communications standards, such as Bluetooth, NFC, Wi-Fi, 3G, etc.

SUMMARY

One embodiment relates to a method performed by a smart appliance. The method includes linking the smart appliance to a financial account of a user. The method also includes monitoring an operation parameter of the smart appliance, and detecting an operational issue of the smart appliance based on the operation parameter. In addition, the method includes communicating the operational issue to a smart appliance payment system. The method further includes detecting, based on the operation parameter, resolution of the operational issue upon completion of a service event on the smart appliance. Still further, the method includes transferring payment for the service event from the financial account of the user upon detecting the resolution of the operational issue.

Another embodiment relates to a smart appliance payment system. The system includes a financial account associated with a user of the system. The system also includes a server having memory and a processor. The processor is configured to associate a smart appliance with the financial account of the user. The processor is also configured to receive, from the smart appliance, an indication of an operational issue with the smart appliance. The processor is further configured to transmit, to the user via a user device, an alert of the operational issue. Still further, the processor is configured to receive, from the smart appliance, an indication of resolution of the operational issue, and a request to transfer payment for the service event from the financial account of the user. Further yet, the processor is configured to transfer payment for the service event from the financial account of the user.

Another embodiment relates to a method including receiving operational information relating to a first smart appliance. The method also includes predicting a future date by which the first smart appliance is required to be replaced by a second smart appliance. The method further includes estimating, based on financial history of the user, a budget capacity for the user to purchase the second smart appliance. Still further, the method includes determining, based on the user's budget capacity and a predicted operating cost of the first smart appliance, a recommended date to purchase the second smart appliance. The recommended date is the same as or earlier than the future date. Further yet, the method includes providing the future date, the estimated budget capacity, and the recommended date to the user.

DETAILED DESCRIPTION

The systems and methods described herein provide a smart appliance payment system configured to facilitate payments via one or more smart appliances. The smart appliance payment system is configured to link a smart appliance with a financial account of the user such that payments may be transferred through the smart appliance. Payments may be made through the smart appliance for various reasons, such as to provide payment for goods or service events relating to the smart appliance, or for other reasons. In addition, the smart appliance payment system also allows users to control various aspects of smart appliances, including those that impact the users' personal finances (e.g., energy usage, maintenance, repair, etc.).

According to an embodiment, a smart appliance is capable of measuring various operation parameters and detecting an operational issue based on the operation parameters. The smart appliance, in cooperation with the smart appliance payment system and third-party computing systems, may determine a service event to be performed to resolve the operational issue. In some embodiments, the user may approve the service event via a smart appliance payment application operating on a user device. The smart appliance, in cooperation with the smart appliance payment system and third-party computing systems, may schedule the service event. Upon completion of the service event, the smart appliance may detect resolution of the operational issue, and may transfer payment for the service event via the smart appliance payment system. According to another embodiment, payments may be made through a smart appliance for extraneous goods or services. For example, a payment may be made to a cleaning service provider through a smart appliance. Payments may be pre-approved or may require approval from a user.

The smart appliance payment system provides significant technical advantages over conventional systems. For example, by facilitating payments through the smart appliance, the smart appliance payment system allows payments to be made faster and more efficiently compared to conventional systems. In addition, by automatically detecting operational issues and facilitating service events, the smart appliance payment system is capable of detecting operational issues before they become worse, thereby reducing potential downtime due to the operational issues and minimizing drops in efficiency. For example, a component may degrade over time, thereby causing a reduction in operational efficiency (e.g., energy usage) without becoming completely non-functional. The smart appliance payment system may automatically detect and facilitate repair of such an issue, while the same issue may go undetected in conventional systems.

Figure 1:
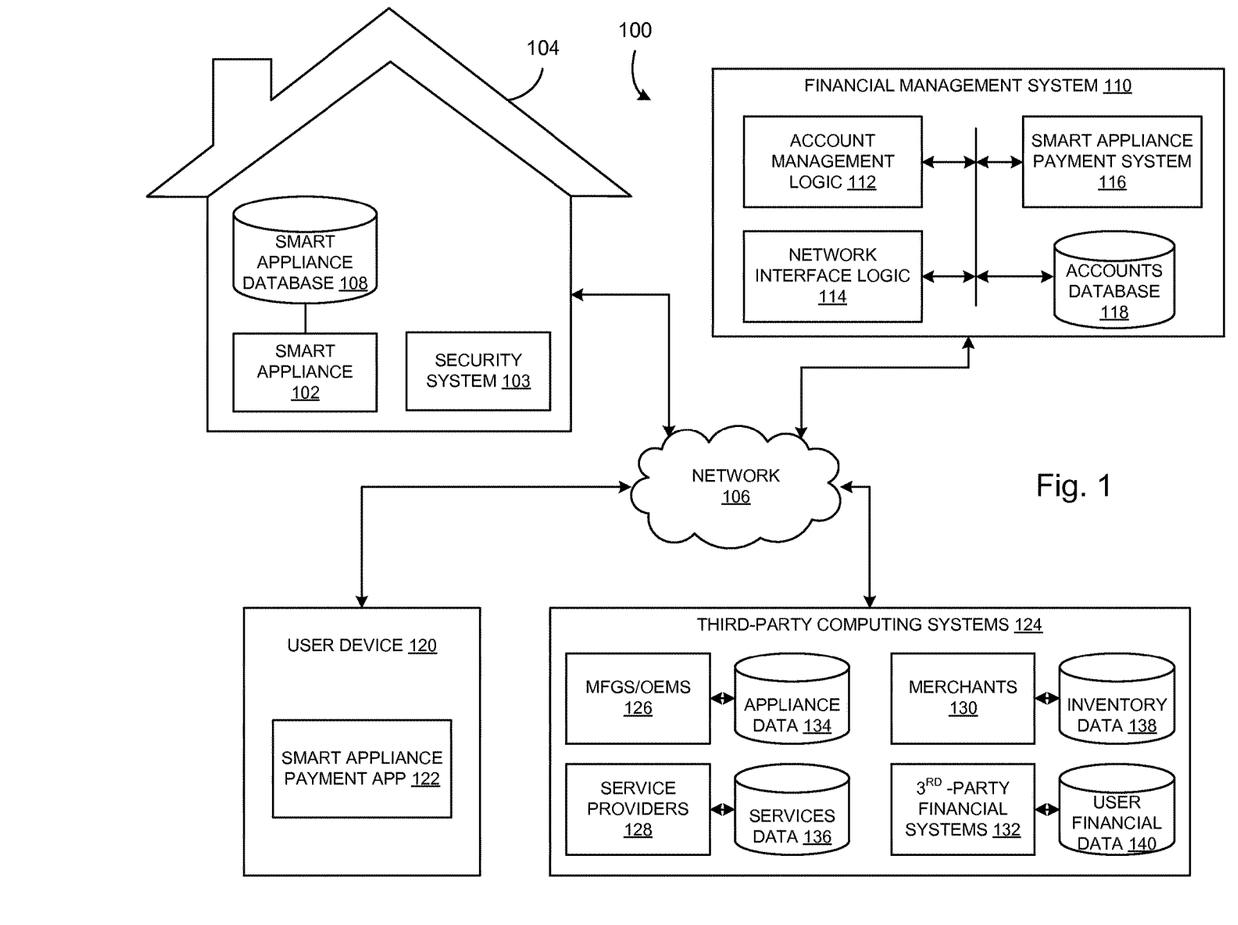
FIG. 1 is a block diagram illustrating a data processing system, according to an embodiment.

FIG. 1 is a block diagram illustrating a data processing system 100, according to an embodiment. As illustrated in FIG. 1, the data processing system 100 includes a smart appliance 102 located in a connected home 104. The connected home may also include a security system 103. The smart appliance 102 may be connected to a home area network ("HAN") within the connected home 104, which provides connectivity between the smart appliance 102 and other devices within the connected home 104 (e.g., the security system 103). The HAN may also provide connectivity to an external network 106 (e.g., a wide area network ("WAN")), for example, to provide connectivity to the Internet.

The smart appliance 102 may include any of various types of devices that are capable of some level of interconnectivity with other devices. Some embodiments include multiple smart appliances 102. The smart appliance 102 may include at least one sensor to measure various operational parameters (e.g., energy usage, temperature, etc.), which may be analyzed to improve local operation and/or may be communicated to other connected devices. The smart appliance 102 may be any of various types of devices, such as, for example, a refrigerator; a washing machine; a dryer; a smart meter; an oven; a thermostat; a heating, ventilating and air-conditioning ("HVAC") system; a security system; a vehicle, etc. The smart appliance 102 may store various types of information, such as make and model information, historical energy usage data, service schedule, time since service, etc.), in a smart appliance database 108. The smart appliance database 108 may be local to the connected home 104 or may be a cloud-based database. In some embodiments, the smart appliance 102 may include one or more user input/output devices. For example, the smart appliance 102 may include a touch screen display configured to display information to a user and to receive touch-inputs from the user responsive to prompts and other information displayed.

In an embodiment, the smart appliance 102 is capable of identifying an operational issue based on operation parameters monitored over time. For example, in some embodiments, the smart appliance 102 is a refrigerator. The smart appliance 102 may monitor energy usage and temperature over time, and may detect an operational issue based on a deviation from typical temperature and/or energy usage. The smart appliance 102 may also be able to diagnose a root cause of the operational issue. For example, the root cause may include a particular component (e.g., a compressor, a water filter, a light bulb, etc.) that is broken or otherwise in need of replacement or repair.

The data processing system 100 also includes a financial management system 110 configured to, among other things, manage financial accounts at one or more financial institutions. In the example of FIG. 1, the financial management system 110 is implemented by an enterprise computing system of a financial institution at which a user has one or more financial accounts.

The financial management system 110 may include, among other logics and systems, account management logic 112, network interface logic 114, and a smart appliance payment system 116. Such systems and logics and other systems and logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the financial management system 110 may include server-based computing systems, for example, comprising one or more networked computer servers that are programmed to perform the operations described herein. In another example, the financial management system 110 may be implemented as a distributed computer system where each function is spread over multiple computer systems.

The account management logic 112 may interact with various backend systems in connection with maintaining financial accounts for account owners. For example, the account management logic 112 may manage bank accounts (e.g., checking and savings accounts). The account management logic 112 manages each user's accounts by facilitating, among other things, account processing, account records management, statement generation, bill pay, funds transfers, etc. Account records include, among other things, records of financial transactions associated with each account. Financial transactions may include, for example, credits or debits to a user's account, such as the purchase of a good or the deposit of a paycheck, and various metadata associated therewith. Account information and records may be stored in an accounts database 118.

The network interface logic 114 may be used to connect the financial management system 110 to the network 106 to permit users to access the financial management system 110, for example, through an online banking website or other website, through an application, through a display on a user device 120, or in other ways. For example, the network interface logic 114 may comprise one or more computers or web servers that provide a graphical user interface (e.g., a series of dynamically-generated web pages) for users that access the financial management system 110 through the web or through an application. The graphical user interface may be used to prompt the user to provide login information, passwords, or other authentication information or other stored tokens. Upon successfully logging in, the graphical user interface may be used to provide the user with account information. The network interface logic 114 may also comprise other logic that is configured to provide an interface for other types of devices such as the smart appliance 102, mobile devices (e.g., cellular phones, smart phones, tablet computers, mobile e-mail devices, etc.), fax machines, ATMs, server-based computing systems, etc. The network interface logic 114 may provide access to an application programming interface (API) for various third-party computing systems 124. The network interface logic 114 may also be used to connect the financial management system 110, including the smart appliance payment system 116, to one or more smart appliances 102.

The smart appliance payment system 116 is configured to link the smart appliance 102 with a financial account of a user via the financial management system 110. By linking the smart appliance 102 to the financial management system 110, the smart appliance payment system 116 provides the ability for users to transfer payments for goods and services via the smart appliance 102. In addition, the smart appliance payment system 116 also allows users to control various aspects of the smart appliance 102, including those that impact the users' personal finances (e.g., energy usage, maintenance, repair, etc.). In some embodiments, multiple smart appliances 102 are linked to the financial account of the user via the financial management system 110 via the smart appliance payment system 116.

In some embodiments, a user may access the smart appliance payment system 116 via the network 106 using the user device 120 (e.g., a smartphone, laptop computer, tablet computer, PDA, portable media device, wearable device, augmented reality device, etc.) or in another manner. In an embodiment, the user may, for example, access the financial management system 110 through a smart appliance payment application 122 stored on the user device 120. In some embodiments, the smart appliance payment application 122 is accessed through a financial services application or website through which the user may access and manage a financial account, which may be operated through the account management logic 112 of the financial management system 110. In other embodiments, the smart appliance payment application 122 is a stand-alone application.

The smart appliance 102 is linked to the smart appliance payment system 116 of the financial management system 110 by user identification and authentication information provided to the smart appliance 102 by the user. For example, in some embodiments, and as described in further detail below, the smart appliance 102 may have a mobile wallet client application installed thereon which enables the smart appliance 102 to engage in financial transactions with the third party computing systems 124. The user may provide the authentication information via a user input of the smart appliance 102 (e.g., touch screen display), or via a user input on the user device 120 connected to the smart appliance 102 (e.g., via a Wi-Fi or Bluetooth connection). The authentication information includes any of a password, a PIN, a user ID, an answer to a verification question, a biometric (e.g., a picture of the user's face, a fingerprint, a voice sample, a retina scan, etc.), an identification of a security image, or a combination thereof. In some arrangements, at least a portion of the authentication information is provided in the form of a customer token and/or a device token stored on the smart appliance 102. The customer token and device token may be tokens that identify the user and the associated smart appliance 102 to the smart appliance payment system 116 in the future. The tokens are initially created by and encrypted by the smart appliance payment system 116 and then transmitted to the smart appliance 102. After the tokens are created and stored on the smart appliance 102, the tokens may be used to supplement or as a substitute for manually entered authentication provided by the user via at the smart appliance 102. In an example embodiment, each time the user accesses the smart appliance payment system 116 with a new smart appliance 102, the new smart appliance 102 is assigned its own device token. A device and customer token are stored on each smart appliance 102 in order to bind the smart appliance 102 to the user. Once the smart appliance 102 is registered with the user, the user may be required to manually enter less information during an authentication process than if the tokens are not present on the smart appliance 102. For example, the user may have an online banking password consisting of a combination of eight or ten or more characters including numbers, upper and lower case characters, punctuation marks, and so on. Rather than enter the full online banking password, the user may only need to enter their existing ATM PIN, device password, or other information to be authenticated via the registered smart appliance 102. Customer tokens and/or device tokens may similarly be used to bind the user device 120 (e.g., via the smart appliance payment application 122 installed on the user device 120) to the smart appliance payment system 116. In some embodiments, the user may be provided with the ability to maintain (e.g., view, edit, add, delete) a list of smart appliances that have been registered with the financial management system 110. For example, such functionality may be provided to the user through an online banking website provided by the financial management system 110.

The smart appliance payment system 116 is configured to, in conjunction with the smart appliance 102 and the account management logic 112, facilitate payments via the smart appliance 102. The smart appliance payment system 116 may transfer payment for various goods and services, such as service events performed on the smart appliance 102, goods (e.g., replacement components) purchased for the smart appliance 102, as well as goods and services unrelated to the smart appliance 102.

Third-party computing systems 124 may be accessed by the smart appliance payment system 116 over the network 106 to provide additional functionality to the user via the smart appliance payment application 122. The third-party computing systems 124 may include, for example, manufacturers/original equipment manufacturers ("OEMs") 126, service providers 128, merchants 130, and third-party financial systems 132. The manufacturers/OEMs 126 may be queried to obtain appliance data 134, which may include various types of information relating to the smart appliance 102, such as operating specifications, service schedules, part lists, repair guides, etc. The service providers 128 may be queried to provide services data 136, such as, for example, lists of service providers capable of providing particular service capabilities; location, cost, and availability of the service providers; customer reviews of the service providers, etc. The merchants 130 may be queried to provide inventory data 138, such as, for example, price and availability information regarding replacement parts and new appliances. The third-party financial systems 132 may be accessed to provide user financial data 140, for example, to provide access to financial accounts (e.g., bank accounts or credit card accounts) that are external to the financial management system 110.

In some embodiments, the third-party computing systems 124 may be accessed directly by the smart appliance 102. For example, upon detecting an operational issue, the smart appliance 102 may contact a third party computer system 124 such as an OEM computer system 126, a service provider computer system 128, or a merchant computer system 130. For example, if the smart appliance 102 is an HVAC system, the HVAC system may include a wall-mounted thermostat with a touch screen display. If the smart appliance 102 determines that a replacement part is needed (e.g., a new furnace filter), the user may be prompted via the touch screen display whether the user wishes to order a new furnace filter for delivery. The replacement part may be ordered from the manufacturer or from another third-party website (e.g., an online website of a home improvement store). As another example, if the replacement part is instead a fan for the furnace, the user may be prompted via the touch screen display to schedule a maintenance call with a local authorized repair service provider of the manufacturer of the furnace. In some embodiments, the user may complete the transaction directly from the touch screen display associated with the smart appliance, without needing to access the system 100 through the user device 120.

In some embodiments, the smart appliance 102 may operate as the mobile device 110 described in U.S. patent application Ser. No. 14/501,856, entitled "MOBILE WALLET ACCOUNT ACTIVATION SYSTEMS AND METHODS," filed on Sep. 30, 2014, and in U.S. patent application Ser. No. 14/501,880, entitled "MOBILE WALLET ACCOUNT PROVISIONING SYSTEMS AND METHODS," filed on Sep. 30, 2014, both of which are hereby incorporated by reference in their entireties and for all purposes. In such embodiments, the smart appliance 102 may have a mobile wallet client 110 installed thereon as described in the afore-mentioned applications. The mobile wallet client 110 may include, among other features, transaction logic configured to allow the smart appliance 102 to engage in transactions with third-party computer systems 124 (e.g., OEM computer system 126, service provider computer system 128, or merchant computer system 130) provide funds in exchange for goods or services (e.g., replacement parts, service calls, etc.). Hence, for example, in the above example where the user may complete the transaction directly from the touch screen display associated with the smart appliance, without needing to access the system 100 through the user device 120, the transaction may be completed using the mobile wallet client application installed on the smart appliance 102. Such an arrangement avoids the need for the user to enter credit card information when completing a transaction for goods or services via the smart appliance 102.

The service events to be performed on a smart appliance 102 to resolve an operational issue may vary greatly in scope and complexity. Some service events are simple and may easily be performed by a lay person, such as replacing a light bulb or a filter. These types of service events may be considered "do-it-yourself" ("DIY") service events. Other service events may be complex and may require the specialized skills or tools of a service professional. These types of service events may be considered "professional" service events. Many service events will fall somewhere between those two extremes, and whether they are considered DIY or professional may depend on a user's mechanical acumen, tools, budget, etc.

Figure 2:
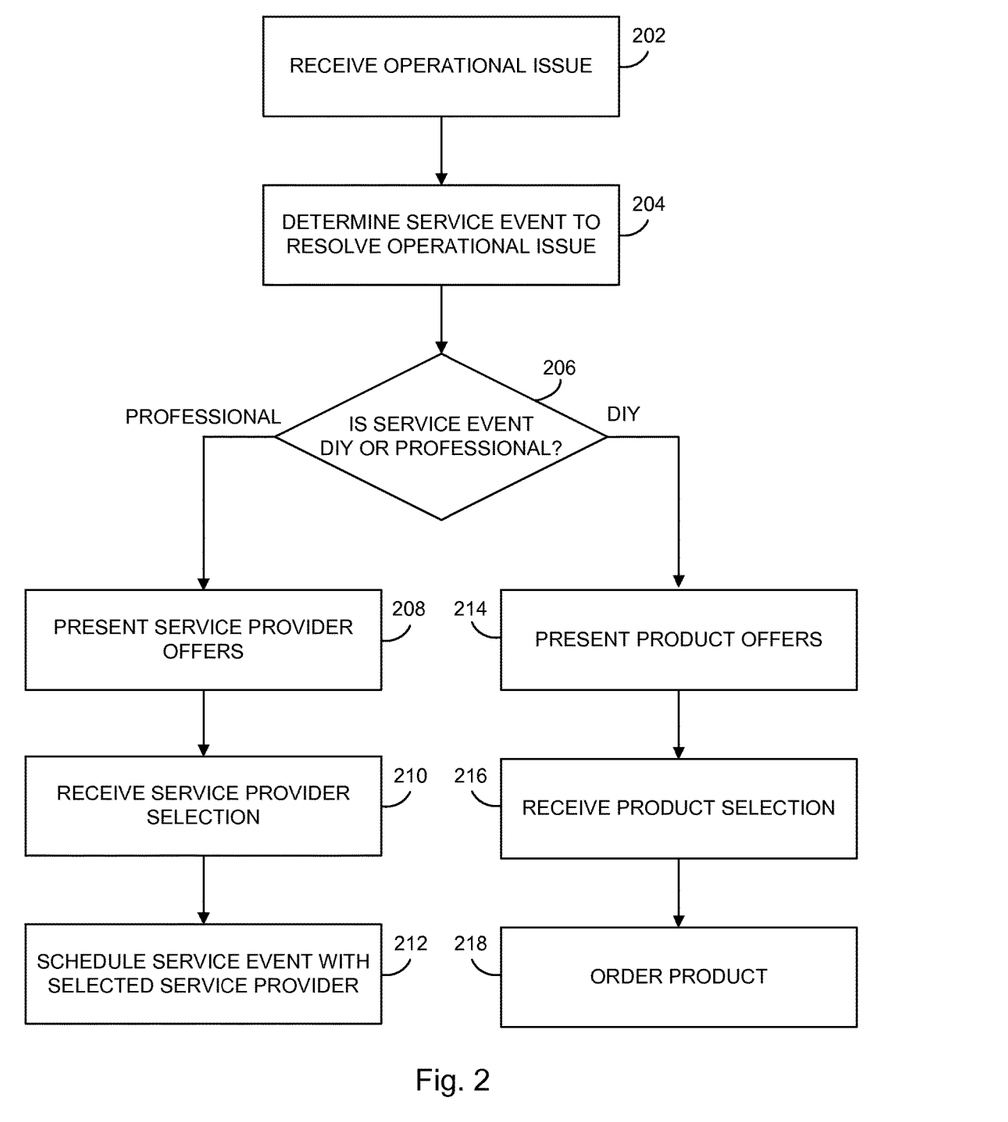
FIG. 2 is a flow diagram of a method of facilitating a service event for a smart appliance, according to an embodiment.

Turning to FIG. 2, a flow diagram of a method 200 of facilitating a service event for a smart appliance is illustrated, according to an embodiment. The method 200 is configured to facilitate a DIY service event or a professional service event, based on the particular service event that is required to resolve the operational issue. As described below in connection with FIG. 2, the method 200 may be performed by the smart appliance payment system 116 of FIG. 1, leveraging the smart appliance 102, the smart appliance payment application 122, and the third-party computing systems 124. In other embodiments, the method 200 may be performed by the smart appliance 102 of FIG. 1, leveraging the smart appliance payment system 116, the smart appliance payment application 122, and the third-party computing systems 124. The smart appliance 102 may be any of various types of devices, such as home appliances, vehicles, commercial equipment, etc.

At 202, information relating to an operational issue of a smart appliance 102 is received by the smart appliance payment system 116 from the smart appliance 102. The information received at 202 may include operational data from the smart appliance 102, or may include an identification of the operational issue that has been self-diagnosed by the smart appliance 102.

At 204, a service event is determined by the smart appliance payment system 116 to resolve the operational issue. The service event may be determined in various ways. In some embodiments, the service event may be determined by cross-referencing the operational issue with a look-up table including a matrix of service events corresponding to various operational issues. In other embodiments, determining the service event may require first determining the root cause of the operational issue. In some embodiments, the smart appliance payment system 116 is configured to diagnose the root cause, while in other embodiments, the smart appliance 102 is configured to self-diagnose the root cause. Various types of analyses may be used to determine the root cause and the service event. For example, in some embodiments, the operational data, such as historical energy usage data, may be analyzed to identify trends that may indicate particular root causes. Other data, such as weather data, for example, may also be considered in the analysis. In some embodiments, diagnostic tools may be leveraged from the third-party computing systems 124, such as the manufacturers/OEMs 126 or the service providers 128.

At 206, it is determined whether the service event is professional or DIY. In some embodiments, it is automatically determined whether the service event is either DIY or professional. For example, certain operational issues, such as replacing a light bulb or an easy-to-access filter may be automatically considered DIY due to their relative simplicity. Other operational issues may be automatically considered professional because they may require certain types of work to be performed by licensed professionals (e.g., plumbers or electricians), or because they require specialized tooling only available to professionals.

In some embodiments, the user can select whether the service event is professional or DIY. Upon receiving an alert of the operational issue through the smart appliance payment application 122, the user may be prompted to select whether the user would like to pursue the DIY service event option or the professional service event option.

If at 206 the service event is determined, either automatically or based on a user selection, to be professional, at 208, service provider offers are presented to the user via the smart appliance payment application 122. As explained in further detail below, the service provider offers may be obtained via the service providers 128 and the services data 136 of the third-party computing systems 124. The service provider offers may be provided from multiple different service providers. The service provider offers may include various details, such as, for example, cost, availability, service provider location, customer reviews, promotional offers, etc. For example, the smart appliance payment system 116 may obtain customer ratings and reviews for service providers from websites such as Yelp™ or Angie's List™.

In some embodiments, pricing of various service offers may be dependent on particular service providers. For example, certain service providers may elect to provide a discount if they have immediate availability to conduct a service event. Some embodiments include dynamic pricing to account for isolated surges in demand. Certain natural events may increase the demand for particular service events. For example, a period of exceptionally hot weather may increase demand for air conditioning repair. In these situations, the smart appliance payment system 116 may increase the cost of service events by a demand multiplier in response to the surge in demand.

At 210, a selection of a service provider is received via the smart appliance payment application 122. The selection may include various details such as a scheduled time and location of the service event, details regarding the smart appliance 102, special service instructions, etc.

At 212, the service event is scheduled with the selected service provider. Scheduling may involve sending an alert to the service provider, creating and sending a digital key to the service provider to allow access to the smart appliance 102 (explained further in connection with FIG. 4), etc.

If at 206 the service event is determined, either automatically or based on a user selection, to be DIY, at 214, product offers are presented to the user via the smart appliance payment application 122. As explained in further detail below, the product offers may be obtained via at least one of the manufacturers/OEMs 126 and the appliance data 134, and the merchants 130 and inventory data 138. The product offers may include various details, such as, for example, cost, availability, DIY instructions, customer reviews, promotional offers, etc.

At 216, a selection of a product is received via the smart appliance payment application 122. At 218, the selected product is ordered. As explained in further detail below, the smart appliance payment application 122 may integrate with various vendors and manufacturers to facilitate product ordering and shipping.

Figure 3:
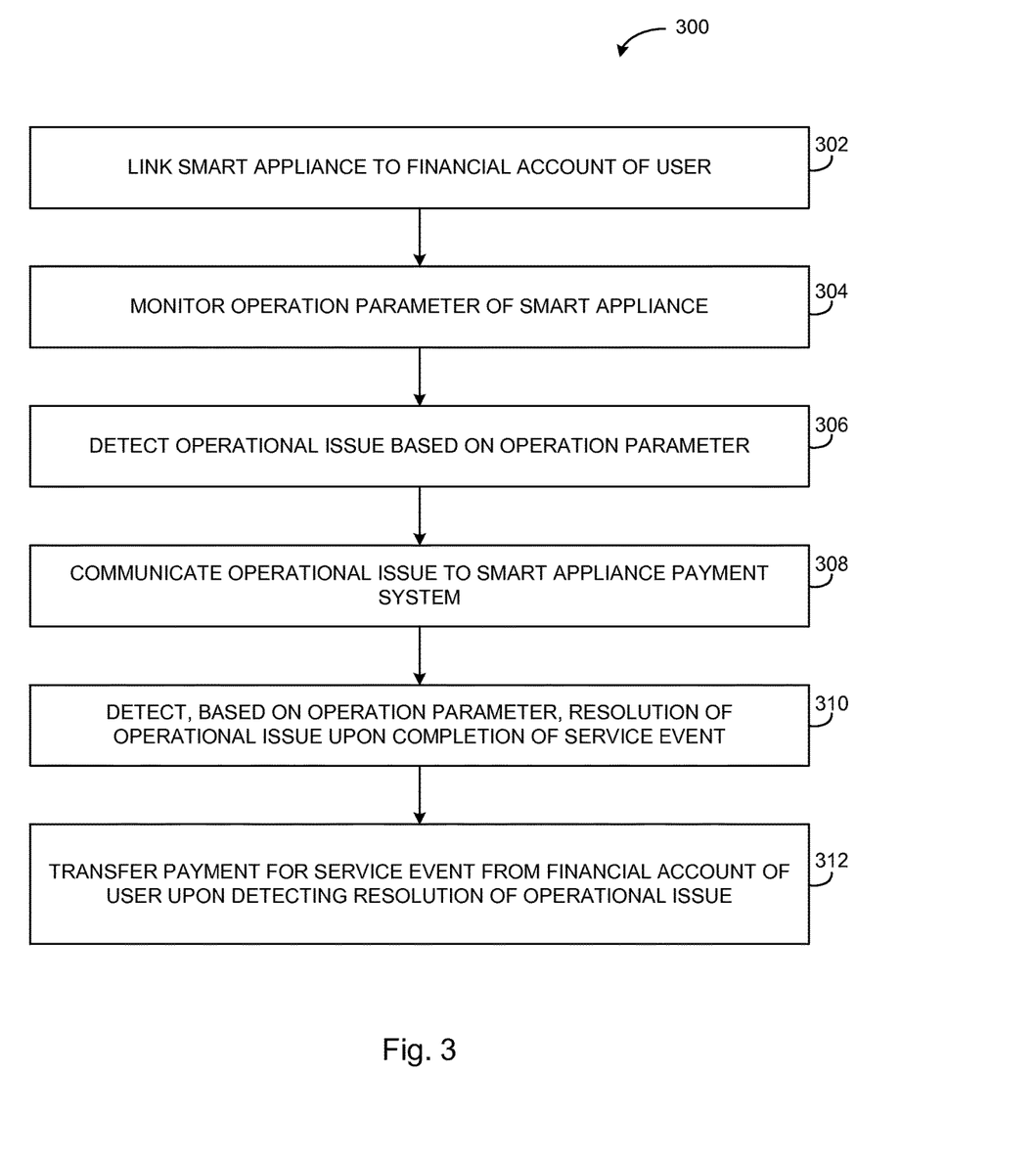
FIG. 3 is a flow diagram of a method of providing a payment from a smart appliance, according to an embodiment.

Turning to FIG. 3, a flow diagram of a method 300 of providing a payment from a smart appliance is illustrated, according to an embodiment. The method 300 is illustrated in FIG. 3 with respect to a service event. For example, the method 300 may be performed if, with respect to the method 200 of FIG. 2, the service event is determined to be a professional service event at 206 of FIG. 2. However, in other embodiments, payments may be transferred via the smart appliance 102 for products (e.g., for DIY service events) and for other reasons. The method 300 as illustrated in FIG. 3 may be performed by the smart appliance 102 of FIG. 1, leveraging the smart appliance payment system 116. In an embodiment, the smart appliance 102 is associated with a financial account of the user, and the payment is to be made from the financial account of the user. The method 300 is described with respect to the smart appliance 102 being a refrigerator. However, the method 300 is also applicable with respect to other types of smart appliances 102, such as, for example, other types of home appliances, vehicles, commercial equipment, etc.

At 302, the smart appliance 102 is linked to a financial account of a user, e.g., through the smart appliance payment system 116. For example, as discussed above, user identification and authentication information may be provided to the smart appliance 102 by the user. The smart appliance 102 transmits the user identification and authentication information to the smart appliance payment system 116 of the financial management system 110, where the information is validated to link the smart appliance 102 to the user's financial account. In some embodiments, the smart appliance payment system 116 is configured to create a customer token and/or a device token, which may be stored on the smart appliance 102 for subsequent authentication.

At 304, an operation parameter of the smart appliance 102 is monitored. The smart appliance 102 may include various sensors to monitor the operation parameters. The operation parameters may include, for example, energy usage (e.g., current and/or voltage measurements), time, temperature, vibration, etc.

At 306, an operational issue is detected by the smart appliance 102 based on the operation parameter. The operational issue may be detected based on a deviation of the operation parameter from an expected operating range. For example, the operational issue may indicate that a component of the smart appliance 102 is malfunctioning, deteriorating, or otherwise approaching its end-of-life. For example, the operation parameter may include a time-of-use of a component, and the operational issue may identify that the time-of-use of the component exceeds a predetermined useful life of the component. In this example, the service event may include replacing the component with a replacement component. In some embodiments, the smart appliance 102 is configured to automatically order the replacement component prior to the time-of-use of the component exceeding its predetermined useful life. In some embodiments, the smart appliance 102 is also configured to diagnose a root cause of the operational issue. The service event may be directed towards the root cause of the operational issue.

At 308, the operational issue detected at 306 is communicated to the smart appliance payment system 116. Upon being notified of the operational issue, the smart appliance payment system 116 may facilitate scheduling of the service event to resolve the operational issue. As discussed in connection with FIG. 2, the smart appliance payment system 116 may determine the service event required to resolve the operational issue. In some embodiments, the smart appliance payment system 116 automatically schedules the service event based on pre-authorization from the user.

In some embodiments, an alert of the operational issue is sent to the user. Alerts may be sent directly from the smart appliance 102 or from the smart appliance payment system 116. Alerts may be transmitted to the user via push notifications through the smart appliance payment application 122, via text messages or emails, etc. In an embodiment, additional alerts are provided to the user based on a status of the service event. For example, service event statuses may indicate service milestones, such as scheduling of a service event, arrival of a service provider at the connected home 104, beginning of service, completion of service, resolution of the operational issue, etc.

Some embodiments further include functionality to manage various aspects of the service event, such as controlling access of the service provider to the location of the smart appliance 102 (e.g., via the connected home 104), as well as monitoring various aspects of the service event as it is being carried out, as explained in further detail below in connection with FIG. 4. For example, in some embodiments, the service provider that is selected to perform the service event is provided a digital key. In an embodiment, the digital key includes a scannable code (e.g., a QR code or a barcode). The digital key may be optically scanned or may be wirelessly transmitted to a receiver via, for example, near field communications ("NFC") or Bluetooth low energy ("BLE") communications signals. In some embodiments, the digital key is active only for a particular time period, such as a window during which the service event is scheduled to be completed. Upon the digital key being verified, the service provider may be provided access to the connected home 104, for example, by automatically unlocking the front door. The service provider may then perform the service event on the smart appliance 102.

At 310, resolution of the operational issue is detected upon completion of the service event. In some embodiments, resolution of the operational issue is detected based on the same operation parameter used to detect the operational issue. In some embodiments, various events are logged during the service event, such as the time that the service provider is allowed access, the time at which the service provider begins the service event, the time that the service event is completed, etc.

At 312, payment for the service event is transferred from the financial account of the user upon detecting the resolution of the operational issue. The amount of the payment for the service event may be a pre-determined amount, and/or may include a labor component. For example, labor may be automatically calculated based on times associated with logged events, such as the difference between the time that the service provider is allowed access and the time that the service event is completed.

Payment may be transferred automatically or upon receiving approval from the user. In some embodiments, payment is automatically transferred upon detecting the resolution of the operational issue. For example, the user may pre-authorize payment for the service event, up to a maximum payment amount. Upon detecting resolution of the operational issue, payment may be automatically provided, as long as the payment amount does not exceed the maximum pre-authorized amount. In some embodiments, payment is transferred upon receiving a request for payment from the service provider. For example, the request for payment may be received via an NFC signal that is transmitted by the service provider via touching or bringing a mobile device within close proximity to an NFC transceiver on the smart appliance 102. In some embodiments, a payment authorization request is sent to the user, and payment for the service event is transferred upon receiving approval of the payment authorization request from the user.

Figure 4:
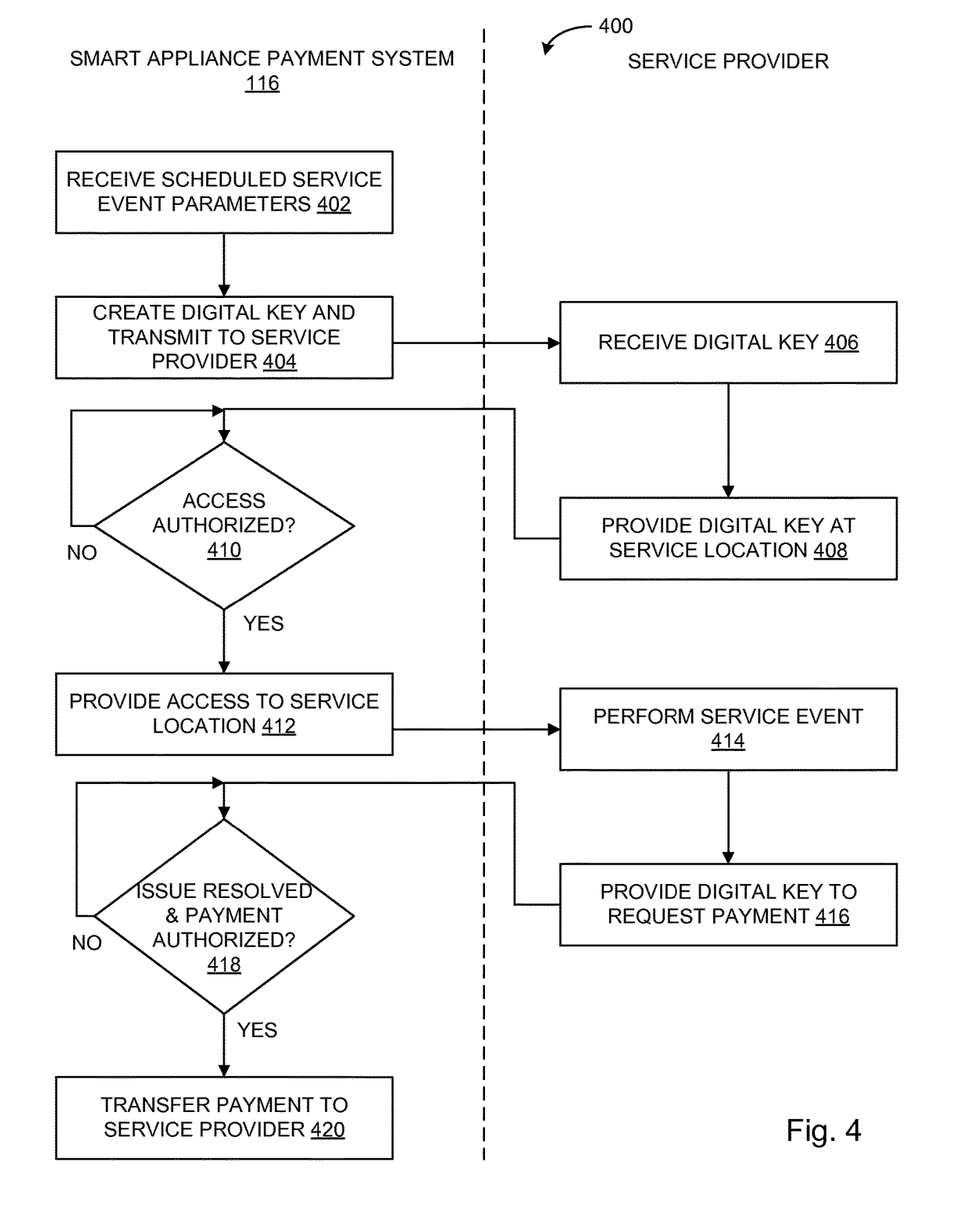
FIG. 4 is a flow diagram of a method of facilitating a service event for a smart appliance, according to an embodiment.

Turning to FIG. 4, flow diagram of a method 400 of facilitating a service event for a smart appliance is illustrated, according to an embodiment. The method 400 may be performed with respect to the data processing system 100 of FIG. 1, including the smart appliance 102 and the smart appliance payment system 116. However, the method 400 may also be performed with respect to other systems and devices. As described in FIG. 4, the method 400 is performed by the smart appliance payment system 116 of FIG. 1 and the service provider with which the service event is scheduled at 212 of FIG. 2. The method 400 provides security, monitoring, and payment control functionality for a user (e.g., an owner of the smart appliance 102).

At 402, scheduled service event parameters are received by the smart appliance payment system 116. The service event parameters may include information relating to the service provider, as well as the details included in the selection made at 210 of FIG. 2, such as a scheduled time and location of the service event, details regarding the smart appliance 102, special service instructions, etc.

At 404, a digital key is created by the smart appliance payment system 116 and is transmitted to the service provider. The digital key may be used for various purposes, such as to provide access to the service provider (e.g., to the connected home 104), to log labor time of the service provider, to transfer payment to the service provider, etc. In an embodiment, the digital key is active only for a limited time period. For example, the digital key may be active for a particular window, such as, for example, one hour before and after the scheduled time of the service event.

At 406, the service provider receives the digital key. In some implementations, the service provider may receive the digital key through a mobile device. For example, the service provider may also have an instance of the smart appliance payment application 122 stored on a mobile device, and may receive the digital key through the smart appliance payment application 122.

At 408, the service provider provides the digital key at the service location. In one embodiment, the service provider provides the digital key to a receiver located at a location (e.g., the connected home 104) at which the smart appliance 102 is located. The digital key may be provided in various ways, such as by scanning a QR code or transmitting an NFC signal, for example. Thus, the digital key may facilitate providing a service provider access to the smart appliance 102 when the user is not present.

At 410, the smart appliance payment system 116 determines, based on the digital key, if the service provider is authorized to access the smart appliance 102. In some embodiments, authorization is determined automatically if the digital key that is provided matches the digital key created at 404. In other embodiments, the user may be prompted, via the smart appliance application 122, to provide authorization upon the digital key being provided at 408.

At 416, the smart appliance payment system 116 provides the service provider access to the location at which the smart appliance 102 is located, if access is authorized at 410. At 414, the service provider performs the service event on the smart appliance 102.

At 418, the smart appliance payment system 116 determines whether the operational issue of the smart appliance 102 has been resolved and whether payment for the service event is authorized. As discussed above, the smart appliance 102 and/or the smart appliance payment system 116 may determine that the operational issue is resolved based on the same parameters used to identify the operational issue. In some embodiments, payment is authorized automatically based on a pre-approved amount upon detecting that the operational issue has been resolved. In other embodiments, payment may require authorization by the user, for example, via the smart appliance payment application 122. In an embodiment, the service provider may request payment by transmitting the digital key to the smart appliance 102 (e.g., via scanning the digital key or transmitting the digital key via an NFC signal).

In some situations, the cost of the service event may be based on actual labor time or the cost may be greater than an originally estimated amount due to additional services being required. In such situations, the user may be prompted to provide authorization for the final cost of the service event, or authorization may be automatically provided if the final cost is not greater than a pre-approved maximum cost. At 420, payment is transferred to the service provider upon, at 418, the operational issue being resolved and the payment being authorized.

The smart appliance 102, in connection with the smart appliance payment system 116 and the account management logic 112, may allow aspects of payments related to the smart appliance 102 to be specifically tailored to a user based upon various factors, such as the user's individual financial behavior and capabilities, usage history of the smart appliance 102, etc.

Figure 5:
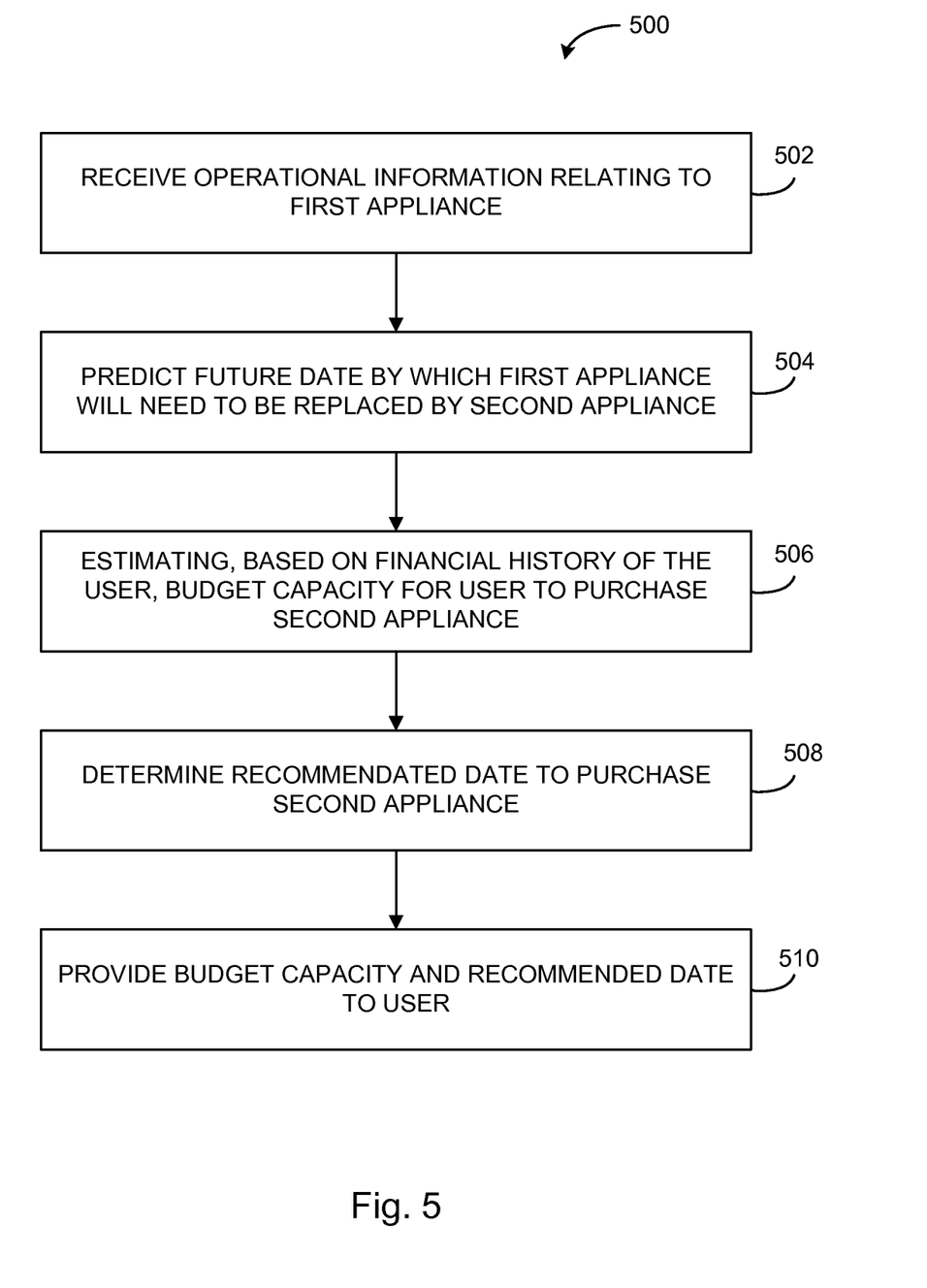
FIG. 5 is a flow diagram of a method of providing a recommended budget for a future predicted purchase of a smart appliance, according to an embodiment.

Turning to FIG. 5, a flow diagram of a method 500 of providing a recommended budget for a future predicted purchase of a smart appliance is illustrated, according to an embodiment. The method 500 may be performed with respect to the data processing system 100 of FIG. 1, including the smart appliance 102, the smart appliance payment system 116, and the account management logic 112. However, the method 500 may also be performed with respect to other systems and devices. As explained in connection with the method 500 of FIG. 5, the smart appliance 102 is a first smart appliance 102 that is to be replaced in the future by a second appliance. The method 500 provides budgeting functionality that allows users to plan and budget for future expenses relating to smart appliances, so that users may save for a replacement second appliance over time instead of having to pay for the entire second appliance at once.

At 502, operational information relating to the first smart appliance 102 is received by the smart appliance payment system 116. At 504, the smart appliance payment system 116 predicts that the first smart appliance 102 will need to be replaced at a future date by a second, new appliance. Replacement of the first smart appliance 102 may be predicted based on various factors, such as based on the operational information received at 502 compared to historical and/or expected operational data, or based on an expected useful life of the first smart appliance 102. The prediction may also include a prediction of a future date at which replacement will be required. The future date may be predicted based on various factors, such as a date on which the first smart appliance 102 is predicted to become non-functional. The future date may also be predicted based on expiration of an expected useful life of the first smart appliance 102. Further, the future date may be based on a predicted operating cost of the first smart appliance 102 exceeding a predetermined value, such as a particular cost per month. The predicted operating cost may take into account a predicted operational history of the first smart appliance 102, which, depending on the operational issue, may be predicted to increase over time due to the operational efficiency of the first smart appliance 102 decreasing over time.

At 506, a budget capacity of the user to purchase the second smart appliance is determined. The budget capacity may be based on financial history of the user received from the account management logic 112. In some situations, it may be predicted that the user can afford to budget a particular amount of money per month towards purchasing the second smart appliance.

At 508, a recommended date to purchase the second appliance is determined based on the user's budget capacity and a predicted operating cost of the first smart appliance 102. The recommended date is to be the same as or earlier than the future date at which the first smart appliance 102 is required to be replaced. In some situations, such as situations in which the first smart appliance 102 fails unexpectedly, the recommended date may be the present date.

At 510, the estimated budget capacity and the recommended date are provided to the user (e.g., via the smart appliance payment application 122). The user can choose to implement, decline, or modify the estimated budget capacity. Based on the user input, the smart appliance payment system 116 may implement the budget specified by the user via the account management logic 112.

A recommended purchase method may also be determined and provided to the user. The recommended purchase method may include purchasing the second smart appliance using funds from at least one financial account of the user. For example, in some situations, the budget capacity of the user may be less than a budget amount required to purchase the second smart appliance on the recommended date. In other words, the user may not be able to afford to purchase the second smart appliance by the recommended date using cash that has been budgeted. In such situations, and the purchase recommendation may include providing the amount corresponding to the budget capacity from a first financial account, and providing the remaining cost from a second financial account. For example, the first financial account may be a bank account and the second financial account may be a credit account.

In some situations, the recommended purchase method is further determined based on various types of offers. For example, offers may include rewards points or cash back if the second smart appliance is purchased using a particular account. The offers may also correspond to the second smart appliance being purchased at a particular merchant or made by a particular manufacturer. The offers may include products from the same or different vendors. The recommended purchase method may be accepted, declined, or modified by the user. Based on a purchase method provided by the user, the second smart appliance may be automatically purchased according to the purchase method provided by the user.

In some embodiments, the smart appliance payment system 116 may interface with certain merchants 130 to provide targeted offers to a user based on various types of analytics performed on, for example, operating data of the smart appliance 102. For example, the smart appliance payment system 116 may predict that the user will need to replace a smart appliance 102 by a future date. Based on that prediction, certain appliance manufacturers may provide targeted advertisements to the user for new appliances. Such advertisements may be provided through various media, such as electronic advertisements on websites accessed by the user, via physical mail, via targeted video advertisements, etc.

The smart appliance payment system 116 may also provide offers for appliances or services through the smart appliance payment application 122 or through a financial services application or website. Offers may also be contingent on the purchase being made through the smart appliance payment system 116. Certain offers may be provided by particular manufacturers (e.g., Whirlpool™, Bosch™, LG™, etc.), or by particular merchants (e.g., Sears™, Home Depot™, Lowes™, etc.). In some embodiments, the financial institution associated with the financial management system 110 may have preexisting relationships with certain manufacturers or merchants, and may have preexisting offer agreements. For example, the financial institution may provide a promotion that purchases at particular merchants are eligible for increased rewards points or cash back. In some embodiments, the smart appliance payment system 116 may include functionality to allocate rewards points or cash back towards a future purchase associated with the smart appliance 102 from a particular merchant, manufacturer, or service provider. The smart appliance payment system 116 may also split payments across multiple sources (e.g., rewards points, bank accounts, credit cards, etc.) based on the best value for the user.

In some embodiments, usage data associated with the smart appliance 102 may be used to provide offers unrelated to the smart appliance 102. For example, an insurance company may provide a discount on homeowners insurance if the user's energy usage is less than a predetermined amount.

According to various embodiments, the smart appliance payment system 116, via the smart appliance payment application 122, may be configured to provide a holistic view to the user of the user's usage of the smart appliance 102. For example, the smart appliance payment system 116, via the smart appliance payment application 122, may be configured to provide remote monitoring and control functionality. Remote monitoring and control functionality may provide the ability for users to monitor energy usage and other operational parameters of the smart appliance 102, and also to control the operation of the smart appliance 102. The remote monitoring and control functionality may also provide the ability for users to monitor and manage items relating to the smart appliance 102. For example, for implementations in which the smart appliance 102 is a refrigerator, the smart appliance payment system 116 may be configured to monitor and manage items (e.g., groceries) stored in the smart appliance 102. The smart appliance payment system 116 may leverage the account management logic 112 and/or the user financial data 140 from the third-party financial systems 132, to obtain purchase history information of the user. The purchase history information may include information relating to items purchased by the user, including the date and cost corresponding to individual items. The smart appliance 102 may include various sensors to identify the particular items stored in the smart appliance 102. The smart appliance payment system 116 may trigger automatic ordering of particular items that are used up or that are expired, and may also provide purchasing recommendations and offers based on the user's usage history. For example, the smart appliance payment system 116 may provide a coupon for a half-gallon of milk if the user typically purchases a full gallon but does not finish it before it expires.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method performed by a smart appliance, the method comprising:
    linking the smart appliance to a financial account of a user;
    monitoring an operation parameter of the smart appliance;
    detecting an operational issue of the smart appliance based on the operation parameter;
    communicating the operational issue to a smart appliance payment system;
    detecting, based on the operation parameter, resolution of the operational issue upon completion of a service event on the smart appliance; and
    transferring payment for the service event from the financial account of the user upon detecting the resolution of the operational issue.

2. The method of claim 1, wherein the operational issue is detected based on deviation of the operation parameter from an expected operating range of the operation parameter.

3. The method of claim 1, further comprising diagnosing a root cause of the operational issue, wherein the service event is directed towards the root cause.

4. The method of claim 1, wherein the operation parameter includes a time-of-use of a component, wherein the operational issue includes the time-of-use of the component exceeding a predetermined useful life of the component, and wherein the service event includes replacing the component with a replacement component.

5. The method of claim 4, further comprising automatically ordering the replacement component prior to the time-of-use of the component exceeding the predetermined useful life of the component.

6. The method of claim 4, further comprising:
    notifying the user prior to the time-of-use of the component exceeding the predetermined useful life of the component;
    providing the user offers for the replacement component from a plurality of vendors;
    receiving a selection of one of the offers; and
    ordering the replacement component according to the selected offer.

7. The method of claim 1, further comprising providing to the user an alert of the operational issue.

8. The method of claim 1, further comprising providing to the user an alert of a status of the service event.

9. The method of claim 1, further comprising:
    providing to the user a list of service providers capable of performing the service event; and
    receiving from the user a selection of one of the service providers from the list,
    wherein the service event is scheduled with the selected service provider.

10. The method of claim 1, further comprising receiving pre-authorization for the payment, the pre-authorization including a maximum payment, wherein the payment for the service event is transferred automatically if the payment for the service event does not exceed the maximum payment.

11. The method of claim 1, further comprising receiving a request for payment from a service provider.

12. The method of claim 11, wherein the request for payment is received via a near-field communication signal.

13. The method of claim 11, further comprising:
    providing, to the user, an authorization request for the payment; and
    receiving, from the user, an approval of the authorization request, wherein payment for the service event is transferred upon receiving the approval.

14. The method of claim 1, further comprising providing, to a service provider of the service event, a digital key configured to be used to authenticate the service provider to provide the service provider access to the smart appliance.

15. The method of claim 1, wherein the smart appliance is a home appliance.

16. The method of claim 15, wherein the home appliance is one of a refrigerator, a washing machine, a dryer, a smart meter, a thermostat, a heating, ventilating and air conditioning system, and a security system.

17. A smart appliance payment system, comprising:
    a financial account associated with a user of the system; and
    a server having memory and a processor, wherein the processor is configured to:
    associate a smart appliance with the financial account of the user, wherein the smart appliance is a home appliance;
    receive, from the smart appliance, an indication of an operational issue with the smart appliance;
    transmit, to the user via a user device, an alert of the operational issue;
    receive, from the smart appliance, an indication of resolution of the operational issue;
    receive, from the smart appliance, a request to transfer payment for the service event from the financial account of the user; and
    transfer payment for the service event from the financial account of the user.

18. The system of claim 17, wherein the operational issue relates to a scheduled maintenance event.

19. The system of claim 17, wherein the operational issue relates to breakage of a component of the smart appliance, and wherein the service event includes replacing the component.

20. The system of claim 17, wherein the operational issue is self-diagnosed by the smart appliance.

21. The system of claim 17, wherein the smart appliance is located at a first location, and wherein the service event is to be performed by a service provider at the first location.

22. The system of claim 21, wherein the processor is further configured to:
    present, to the user via the user device, a plurality of service event offers;
    receive, from the user via the user device, a selection of one of the plurality of service event offers;
    prepare a service order based on the selected service event offer; and
    transmit, to a service provider of the selected service event offer, the service order.

23. The system of claim 22, wherein each of the plurality of service event offers includes an estimated cost.

24. The system of claim 23, wherein the processor is further configured to:
   estimate a cost associated with not performing any of the plurality of service event offers; and
   present, to the user via the second device, the estimated cost associated with not performing any of the plurality of service event offers.

25. The system of claim 23, wherein the processor is further configured to receive, from the user via the second device, pre-authorization of payment for the selected service event offer.

26. The system of claim 22, wherein the processor is further configured to transmit, to the service provider, a security token to provide the service provider access to the first location.

27. The system of claim 26, wherein the security token includes a QR code, wherein the service provider is provided access to the first location by scanning the QR code.

28. The system of claim 27, wherein the processor is further configured to:
   log a first time at which the technician is provided access to the first location;
   log a second time at which the service event is completed; and
   determine a cost associated with the service event based on a difference between the first and second times.

29. A home appliance payment system, comprising:
   a home appliance that is associated with a financial account of a user, the home appliance comprising:
      one or more sensors arranged to generate data corresponding to an operating condition for the home appliance; and
   a server communicably coupled to the home appliance, the server having memory and a processor, wherein the processor is configured to:
   receive, from the home appliance, an indication of an operational issue with the home appliance, the indication being generated by the home appliance based on the data generated by the one or more sensors which indicates the operational issue;
   receive, from the home appliance, an indication of resolution of the operational issue, the indication being generated by the home appliance based on the data generated by the one or more sensors which indicates the resolution of the operational issue;
   receive, from the home appliance, a request to transfer payment for the service event from the financial account of the user; and
   responsive to receiving the indication of the resolution of the operational issue, transfer payment for the service event from the financial account of the user.

30. The home appliance payment system of claim 29, wherein the home appliance is a refrigerator.

31. The home appliance payment system of claim 29, wherein the home appliance is an appliance within a heating, ventilating and air conditioning system.

32. The home appliance payment system of claim 29, wherein the home appliance is a security system.

33. The home appliance payment system of claim 29, wherein the home appliance one of a washing machine or a dryer.

34. The home appliance payment system of claim 29, wherein the home appliance is a smart meter.

* * * * *